United States Patent [19]

Schmiegel

[11] 3,933,732

[45] Jan. 20, 1976

[54] FLUOROELASTOMER COMPOSITION AND CURING PROCESS

[75] Inventor: Walter Werner Schmiegel, Wilmington, Del.

[73] Assignee: E. I. Du Pont de Nemours and Company, Wilmington, Del.

[22] Filed: May 14, 1974

[21] Appl. No.: 469,840

Related U.S. Application Data

[63] Continuation-in-part of Ser. No. 294,794, Sept. 28, 1972, abandoned, which is a continuation-in-part of Ser. No. 212,669, Dec. 27, 1971, abandoned.

[52] U.S. Cl. .... 260/42.27; 260/23 XA; 260/47 UP; 260/79.3 R; 260/80.77; 260/87.7
[51] Int. Cl.² .................. C08F 27/06; C08F 29/16
[58] Field of Search........ 260/23 XA, 47 UP, 42.27, 260/87.7, 80.77, 79.5 R, 79.3 R

[56] References Cited
UNITED STATES PATENTS

| | | | |
|---|---|---|---|
| 3,243,411 | 3/1966 | Tawney | 260/61 |
| 3,502,628 | 3/1970 | Barney | 260/87.7 |
| 3,655,727 | 4/1972 | Patel | 260/47 UP |
| 3,686,143 | 8/1972 | Bowman | 260/47 UP |
| 3,712,877 | 1/1973 | Patel | 260/87.7 |

*Primary Examiner*—Christopher A. Henderson

[57] ABSTRACT

A fluoroelastomer composition which has beneficial utility in the rapid manufacture of cured fluoroelastomer articles having good strength and resistance to compression set can be prepared by blending the following components: (A) an elastomeric copolymer of vinylidene fluoride and another fluorine-containing monomer, and (B) as a vulcanization agent, a carboxylic acid ester of 4,4'-sulfonylidiphenol (for example, 4,4'-sulfonyldiphenol diacetate); and when making the cured articles, it is also preferred to add (C) a suitable metal compound such as a divalent metal oxide or hydroxide, and (D) a suitable accelerator, for example a certain type of quaternary phosphonium compound.

12 Claims, No Drawings

FLUOROELASTOMER COMPOSITION AND CURING PROCESS

CROSS REFERENCE TO RELATED APPLICATIONS

This is a continuation-in-part of U.S. patent application Ser. No. 294,794 filed Sept. 28, 1972; U.S. Ser. No. 294,794 was a continuation-in-part of U.S. patent application Ser. No. 212,699 filed Dec. 27, 1971 both of these prior applications have been abandoned.

BACKGROUND OF THE INVENTION

This invention concerns a useful fluoroelastomer composition and a process for curing a fluoroelastomer composition.

Fluoroelastomers are known to be useful in specialized areas, such as high temperature-resistant gaskets, seals, diaphragms, and tubing. Fabricated fluoroelastomer articles can withstand temperatures of about 250°–350°C while retaining their good elasticity.

It is necessary for many applications, for example gaskets for high-temperature reactors, that the fluoroelastomer article be resilient and have low compression set. This is accomplished by curing the article; that is, by vulcanizing or cross-linking the elastomer.

The industries which manufacture and use fluoroelastomer compositions for the production of cured fluoroelastomer articles are in need of a new fluoroelastomer vulcanization process (and a fluoroelastomer composition for use therein) which makes it possible to combine satisfactory cure rates with good processing safety, good storage stability and reasonable cost of the unvulcanized formulations; and which yields vulcanized articles of good stress/strain properties and low compression set. There is also a need in many applications for such a process which enables one to produce cured articles which are relatively soft and rubbery as well as low in compression set. Furthermore, there is a need in various applications for a process which permits the use of economical formulations having a relatively high filler content in the manufacture of cured articles having low compression set and good stress/strain properties.

It is known that fluoroelastomers can be cured by using an aromatic hydroxylic compound as a vulcanization agent. One such compound is 4,4'-sulfonyldiphenol. When using this compound, one can make cured fluoroelastomer articles having excellent physical properties (e.g. desirable stress/strain values and low compression set values). This compound is also relatively low in cost. However, the cure rates obtainable with 4,4'-sulfonyldiphenol have been considerably slower than one can obtain with such aromatic hydroxylic compounds as hexafluoroisopropylidene-bis (4-hydroxybenzene) which is relatively expensive. Therefore, in spite of its low cost, 4,4'-sulfonyldiphenol has had very little use by those who manufacture cured fluoroelastomer articles.

SUMMARY OF THE INVENTION

The present invention provides a fluoroelastomer composition comprising (A) an elastomeric copolymer of vinylidene fluoride and at least one other fluorine-containing monomer, and (B) as a vulcanization agent, a carboxylic acid ester of 4,4'-sulfonyldiphenol in which 25–100% of the equivalents of hydroxyl groups of said diphenol have been converted to carboxylic acid ester groups, said carboxylic acid being selected from the group: aliphatic and aromatic carboxylic acids having up to 26 carbon atoms.

The invention also provides a process which comprises providing a mixture comprised of components A and B as described in the preceding paragraph, and curing the resulting mixture; preferably a suitable metal compound and vulcanization accelerator are added to the mixture prior to the curing operation, as explained below.

DESCRIPTION OF PREFERRED EMBODIMENTS

In reference to the component A vinylidene fluoride copolymer, the "other fluorine-containing monomer" is usually an ethylenically unsaturated monomer containing at least one fluorine atom substitutent on each double-bonded carbon atom. The copolymer is preferably composed of at least one of the following: copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, a perfluoroalkyl perfluorovinyl ether and hexafluoropropylene.

Copolymers of vinylidene fluoride and hexafluoropropylene are described in U.S. Pat. No. 3,051,677 issued to Rexford. Copolymers of vinylidene fluoride, tetrafluoroethylene and hexafluoropropylene are described in U.S. Pat. 2,968,649 issued to Pailthorp and Schroeder. Copolymers of vinylidene fluoride and pentafluoropropylene are described in U.S. Pat. No. 3,331,823 issued to Sianesi et al.; and copolymers of these two components with tetrafluoroethylene are described in U.S. Pat. No. 3,335,106 issued to Sianesi et al. Copolymers of vinylidene fluoride, a perfluoroalkyl perfluorovinyl ether (having 1–5 carbon atoms in the alkyl group) and hexafluoropropylene are described in U.S. Pat. No. 3,235,537 issued to Albin and Gallagher.

The component B vulcanization agent is a carboxylic acid ester of 4,4'-sulfonyldiphenol as described above. One very useful type of compound in this class is an ester of said diphenol and a fatty acid containing 2–18 carbon atoms; the use of a fatty acid containing 2–8 carbon atoms (acetic to octanoic) is especially preferred. Particularly preferred is the diacetate of 4,4'-sulfonyldiphenol.

In preparing component B, one skilled in the art will be able to select a suitable carboxylic acid from any of the known aliphatic and aromatic carboxylic acids having up to 26 carbon atoms. For example, he can use a fatty acid (aliphatic monocarboxylic acid) such as acetic, propionic, butyric, isovaleric, octanoic, stearic, oleic or linoleic acid or the like. Or he can use an aliphatic dicarboxylic acid such as malonic, glutaric or adipic acid or the like. Or he can use an aromatic acid such as benzoic acid or a lower alkyl (e.g. $C_1$–$C_4$) substituted benzoic acid or the like. It is preferred to use an acid which is free of sulfonic acid groups or other reactive acidic substituents. The acid is preferably composed only of carbon and hydrogen atoms except for the carboxyl group.

Component B can be a full ester or a partial ester of 4,4'-sulfonyldiphenol. When using a partial ester, one uses the product of reacting about 25–99% of the total number of equivalents of hydroxyl groups present in the diphenol with carboxyl groups to form ester groups.

In preparing component B, one skilled in the art will be able to use known methods for preparing ester compounds. For example, he can use the methods of making carboxylic acid esters shown in the "Kirk-Othmer Encyclopedia of Chemical Technology", Second Edition, Volume 8, pages 313–356, Interscience (1968). To illustrate further, he can prepare the diacetate by reacting acetic anhydride with the diphenol in the presence of a suitable solvent (e.g. acetic acid) at about through 22°–150°C, heating the mixture until the reaction has been completed, and isolating the resulting ester. And he can prepare the octanoate or benzoate by reacting the acid chloride of the corresponding acid with the diphenol in the presence of a suitable solvent.

When component B is an ester of a polycarboxylic acid, it is preferred that substantially all the carboxylic groups be esterified. Free acid groups in any substantial amount tend to retard the cure. Thus, in preparing such an ester, it is advisable to use a sufficient excess of 4,4'-sulfonyldiphenol to esterify all of practically all of the acid groups; or one can prepare a mixed ester in which the carboxyl groups not esterified with the diphenol are esterified with a suitable lower alkyl alcohol, for example methanol or ethanol. An example of such a mixed ester is 4,4'-sulfonyldiphenol bis [ethyl malonate].

The vulcanization agent used in the present composition can be considered as being a crosslinking agent for the vinylidene fluoride copolymer since it causes cross-linking of the copolymer when used with the component D accelerator.

It is possible to use a blend of component B and one or more compounds known to function as a vulcanization or cross-linking agent for the copolymer. For example, the novel composition can also contain as an additional vulcanization agent about 1–75 mol percent (based on the total mols of vulcanization agent present) of 4,4'-sulfonyldiphenol or another hydroxylic aromatic compound selected from the group: mono-, di-, tri-, and tetrahydroxybenzenes, naphthalenes, and anthracenes, and bisphenols of the formula

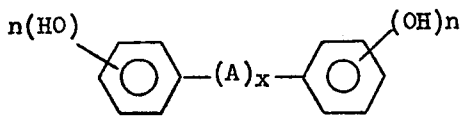

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the hydroxylic compound is optionally substituted with at least one atom of chlorine, fluorine or bromine, a —CHO group, or a carboxyl or acyl radical. One skilled in the art will be able to make good use of such vulcanization agent blends in the preparation of a series of compositions of this invention having certain desired predetermined cure rates.

The composition composed of components A and B is a useful article of commerce which (as in the case of a novel polymer) can be supplied to manufacturers of fabricated fluoroelastomer articles who wish to modify the material (e.g. with certain metal compounds and accelerators) according to the requirements of particular end products before they carry out the curing operation. Another useful approach is for the supplier of the fluoroelastomer composition to add one or both of the following components before the composition is delivered to the person who makes the cured articles: (Component C) a metal compound selected from the group consisting of divalent metal oxides, divalent metal hydroxides, and mixtures of such oxides or hydroxides with metal salts of weak acids; (Component D) a compound capable of functioning as a vulcanization accelerator in the presence of component B.

In the majority of applications, the curable composition used by the person who makes the cured articles preferably contains about 0.0005–0.05 mol of component B per 100 grams of component A, and also contains at least two equivalents of the component C metal compound per equivalent of Component B, and about 0.1–10 grams of the component D accelerator per 100 grams of component A. It is advisable to add at least enough of component C to neutralize the acid formed during the curing process. Especially preferred are compositions wherein the component B content is about 0.001–0.015 mol per 100 grams of component A, the component C content is about 1–15 grams per 100 grams of component A, and the component D content is about 0.2–2.0 grams per 100 grams of component A.

Component C of the composition is a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid; for example, a mixture containing about 1–70% by weight of the metal salt. It is known in the art that weak acids can be considered as those which have a first acid constant of less than $10^{-2}$ (see "General Chemistry", third edition, by L. Pauling, pages 500–502, published in 1970 by W. H. Freeman Co. of San Francisco, California). Among the useful metal salts of weak acids are barium-, sodium-, potassium-, lead-, and calcium-/-stearate, -benzoate, -carbonate, -oxalate, and -phosphite. The amount of the metal compound added generally is about 1–15 parts by weight per 100 parts of fluoroelastomer, about 2–6 parts being preferred. The metal compound concentration to some extent affects the rate of cure, and below the preferred range the cure rate may sometimes be unduly decreased. Above the preferred range, the elastic properties of a cured fluoroelastomer are gradually impaired and it is, therefore, advantageous not to use too large amounts of the metal compound.

The metal compound serves a dual purpose. It absorbs certain gaseous and acidic materials which are evolved during vulcanization and can chemically attack and weaken the fluoroelastomer. It also provides a long term aging stability. When using a metal oxide, it can be compounded with a fluoroelastomer stock either free or as a metal oxide complex or chelate with organic complexing agents and ligands, such as cyclic polyethers, amines, phosphines, ketones, alcohols, phenols, or carboxylic acids.

One very useful type of component D accelerator is a compound of the formula

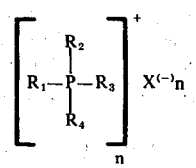

wherein P is selected from the group: phosphorous, arsenic, and antimony; $R_1$, $R_2$, $R_3$ and $R_4$ are selected individually from the group: $C_1$–$C_{20}$ alkyl, aryl, aralkyl, alkenyl, and the chlorine, fluorine, bromine, cyano, -OR and -COOR substituted analogs thereof, R being selected from the group: $C_1$–$C_{20}$ alkyl, aryl, aralkyl, and alkenyl; and X is selected from the group: halide, sulfate, sulfite, carbonate, pentachlorothiophenolate, tetrafluoroborate, hexafluorosilicate, hexafluorophosphate, dimethyl phosphate and $C_1$–$C_{20}$ alkyl-, aryl-, aralkyl-, and alkenyl-/-carboxylate and -dicarboxylate; n is 1 or 2 and equal to the valence of the anion X. The preferred compound of this type is benzyl triphenyl phosphonium bromide or -chloride. It will be understood that the above formula represents that the number of negative and positive charges present in the accelerator molecule are equal; thus, when an anion is used which carries a plurality of negative charges, then the number of cations present is a plurality equal to the number of negative charges on the anion. This type of accelerator is described in greater detail in Pattison's Can. Pat. No. 945,300, granted Apr. 9, 1974. This patent also describes in greater detail the hydroxylic aromatic compounds mentioned herein which can be used as vulcanization agents in combination with the component B ester.

Other useful component D accelerators include: methyltrioctylammonium chloride and other quaternary ammonium compounds such as those described by Patel et al., U.S. Pat. No. 3,655,727 and by Pattison in French Pat. No. 71–18215; triarylphosphoranes such as those described by De Brunner in U.S. Pat. No. 3,752,787; and guanidines and amidines such as those described by Bowman in U.S. Pat. No. 3,686,143.

Components B, C, and D can be mixed with the elastomeric copolymer by means of any mixing apparatus known to be useful for preparing rubber compositions; for example, a roller-type rubber mill or a Banbury mixer. Known fillers, pigments, pore-forming agents and other additives can also be blended with the composition.

The initial curing of the curable composition is preferably carried out by heating the composition for about 2–60 minutes at about 120°–205°C.; conventional rubber-curing presses, molds, extruders, and the like provided with suitable heating and curing means can be used. Curing can be done at a lower temperature for a longer time (e.g. 100°C. for 15 hours) or at a higher temperature for a very short period of time (e.g. a few degrees above 205°C. for less than one minute). Also, if one wants a product having a maximum heat resistance and dimensional stability, it is preferred to carry out a post-curing operation wherein the article is heated in an oven or the like for an additional period of about 1–48 hours at about 204°–260°C. One skilled in the art will realize that the best curing time and temperature for a particular application will depend on such factors as the nature and proportion of ingredients and the properties needed in the final product.

The mixture of components A and B, and preferably also of components C and D, can be mixed with a solvent for component A to form a liquid composition useful in the preparation of adhesive layers, coatings, films, and the like. Among the preferred solvents are acetone, methylethyl ketone, ethyl acetate, amyl acetate, and tetrahydrofuran.

The composition of this invention is very useful for the manufacture of cured fluoroelastomer articles having low compression set. For example, the composition is useful for the manufacture of heat-resistant and resilient O-ring seals, shaft seals, gaskets, tubing and the like. In various embodiments of the invention, one does not have to obtain a very high state of cure in order to make a product having desirable low compression set values; this is quite unexpected. The invention can be employed to manufacture cured fluoroelastomer articles while achieving such desirable results as good storage stability of the composition (component C and fillers are preferably added a short time before use), good flow properties, rapid cure at temperatures well below the decomposition temperature of the copolymer, and cured products which are surprisingly soft and rubbery in addition to having good stress/strain properties, and low compression set. Also, worthwhile economic advantages can be realized when certain preferred embodiments of the present composition are compared with some of the best prior art fluoroelastomer compositions. For example:

1. when a relatively expensive vulcanization agent such as hexafluoroisopropylidene-bis(4-hydroxybenzene) of a high quality prior art composition is replaced with a relatively inexpensive vulcanization agent such as the diacetate of 4,4'-sulfonyldiphenol of the present invention; or
2. when a relatively high filler content is used in the present composition to make cured articles having low compression set and good stress/strain properties.

By using the present composition and process, one can over come the prior art problem discussed above regarding the slow cure rates obtained when using 4,4'-sulfonyldiphenol as the vulcanization agent for fluoroelastomers; moreover, one can still obtain cured products having excellent physical properties. The faster cure rates permit the use of shorter and more economical press-curing operations.

The following examples illustrate the invention; all amounts are by weight unless otherwise indicated.

EXAMPLE 1

A preferred fluoroelastomer composition of the present invention is prepared, cured and tested. The composition is prepared by blending the following on a 2-roll mill whose rolls are at about 25°C: 100 parts of fluoroelastomer, 15 parts of Thermax MT carbon black, 10 parts of Austin black, 6 parts of calciumhydroxide, 3 parts of magnesium oxide, 0.5 part of benzyl triphenyl phosphonium chloride, and 2.67 parts of a vulcanization agent composed of 4,4'-sulfonyldiphenol diacetate. The fluoroelastomer is a vinylidene fluoride/hexafluoropropylene 60:40 copolymer whose Mooney Viscosity (ML-10 at 100°C) is 60. Austin black is a finely pulverized bituminous coal of specific gravity 1.25, containing 77 percent carbon and 17 percent volatile components. It is commercially available from the Chemical Products Division of Slab Fork Coal Company, Slab Fork, West Virginia. The amount of vulcanization agent added is the amount needed to obtain a reasonably full state of cure. The number of moles of vulcanization agent used in each of the present examples is about equal.

Test results are shown in Table I. Samples of the freshly-prepared uncured compositions are used for measuring (a) curing characteristics with the oscillating disc cure meter according to ASTM Method D-2084 and (b) Mooney Scorch according to ASTM method D-1646–63. Under "curing characteristics", the table shows the time in minutes to reach 50 percent of full cure (t'50) and 90 percent of full cure (t'90).

In preparing the cured samples, the pellets are pressed-cured for 20 minutes at 177°C; the other samples are pressed-cured for only 15 minutes at 177°C. Press-curing is done at a total pressure of about 40,000 pounds. The cured samples are post-cured in an oven containing circulating air in which the temperature reaches 260°C in four hours and remains at 260°C for 24 hours. The cured and heat-aged samples are prepared by subjecting the resulting cured samples to a temperature of 276°C for 70 hours in an oven containing circulating air. The modulus, tensile and elongation values are obtained at room temperature by ASTM Method D-412–66. The hardness values indicate Shore hardness (Durometer A) as tested by ASTM Method D-676. Compression set values are obtained by ASTM Method D-395–61; the pellets have a thickness of 0.50 inch and a diameter of 0.75 inch, and the O-rings measure 1 inch by 0.139 inch.

The fluoroelastomer composition of Example 1 is very useful for the rapid manufacture of cured fluoroelastomer articles having excellent physical properties (as indicated in Table I); relatively short and economical press-curing cycles can be used to manufacture such articles. The Example 1 composition can be used for the manufacture of heat-resistant and resilient O-rings, seals, gaskets, tubing and the like.

EXAMPLE 2

For purposes of comparison, a fluoroelastomer composition outside the present invention is prepared, cured and tested in the manner described in Example 1 except the 4,4'-sulfonyldiphenol diacetate vulcanization agent used in Example 1 is replaced with 2.0 parts of 4,4'-sulfonyldiphenol.

Test results are shown in Table I, where it can be seen that 22.5 minutes are required to reach 50 percent of full cure, compared with 4.5 minutes in Example 1; and 35.5 minutes to reach 90 percent of full cure, compared with 17 minutes in Example 1. Thus, a very worthwile improvement in curing rate is obtained in Example 1.

TABLE I

|  | Example | | |
|---|---|---|---|
|  | 1 | 2 | 3 |
| Curing Characteristics at 177°C/350°F, ASTM D-2084 | | | |
| $M_L$, in./lb. | 10.5 | 6.5 | 7.5 |
| $M_H$, in./lb. | 59 | 85 | 68.5 |
| t'50, min. | 4.5 | 22.5 | 4.1 |
| t'90, min. | 17 | 35.5 | 16 |
| Mooney Scorch-121°C/250°F | | | |
| Minimum | 37 | 39 | 30 |
| Minutes to 2-point rise | — | >30 | — |
| Minutes to 5-point rise | 16 | — | 7.5 |
| Minutes to 10-point rise | 22.5 | — | 9.25 |
| Test Results | | | |
| Cured Samples | | | |
| Modulus-100%, psi | 540 | 650 | 1020 |
| Tensile strength, psi | 1980 | 1820 | 1890 |
| Elongation at break, % | 270 | 210 | 180 |
| Hardness | 68 | 72 | 76 |
| Compression Set | | | |
| pellets - 70 hrs./232°C | 31 | 25 | 45 |
| O-rings - 70 hrs./232°C | 34 | 27 | 30 |
| Cured/Heat-Aged Samples | | | |
| Modulus-100%, psi | 620 | 500 | 1390 |
| Tensile strength, psi | 1600 | 1340 | 1770 |
| Elongation at break, % | 235 | 220 | 135 |
| Hardness | 72 | 72 | 80 |

EXAMPLE 3

Another fluoroelastomer composition of this invention is prepared, cured and tested in the manner described in Example 1 except the 4,4'-sulfonyldiphenol diacetate vulcanization used in Example 1 is replaced with 4.02 parts of 4,4'-sulfonyldiphenol dioctanoate.

Test results are shown in Table I, where it can be seen that the composition has a surprisingly fast cure rate and the cured samples have very good physical properties.

EXAMPLE 4

Another fluoroelastomer composition of this invention is prepared and cure-tested in the manner described in Example 1 except the 4,4'-sulfonyldiphenol diacetate vulcanization agent used in Example 1 is replaced with 3.66 parts of 4,4'-sulfonyldiphenol dibenzoate; also, the carbon black content consists of 30 parts of Thermax MT carbon black.

Results of the curing test are shown in Table II where it can be seen that the composition has a desirably fast cure rate. Cured samples of the composition are found to have very good physical properties.

EXAMPLE 5

For purposes of comparison, a fluoroelastomer composition outside the present invention is prepared and cure-tested by repeating Example 4 except the 4,4'-sulfonyldiphenol dibenzoate vulcanization agent is replaced with 2.0 parts of 4,4'-sulfonyldiphenol.

Results of the curing test are shown in Table II, where it can be seen that the Example 5 composition has a much slower cure rate than the Example 4 composition.

TABLE II

|  | Example | |
| --- | --- | --- |
|  | 4 | 5 |
| Curing Characteristics at 177°C/350°F, ASTM D-2084 | | |
| $M_L$, in./lb. | 4.6 | 6.5 |
| $M_H$, in./lb. | 61.2 | 88 |
| t'50, min. | 6.8 | 19.4 |
| t'90, min. | 20.8 | 30 |

I claim:

1. A fluoroelastomer composition comprising (A) an elastomeric copolymer of vinylidene fluoride and at least one other fluorine-containing monomer, and (B) as a vulcanization agent, a carboxylic acid ester of 4,4'-sulfonyldiphenol in which 25–100% of the equivalents of hydroxyl groups of said diphenol have been converted to carboxylic acid ester groups, said carboxylic acid being selected from the group: aliphatic and aromatic carboxylic acids having up to 26 carbon atoms.

2. A composition according to claim 1 which also contains
    (C) a metal compound selected from the group consisting of divalent metal oxides, divalent metal hydroxides, and mixtures of such oxides or hydroxides with metal salts of weak acids.

3. A composition according to claim 1 which also contains
    (D) a compound capable of functioning as a vulcanization accelerator in the presence of component B.

4. A composition according to claim 1 which contains about 0.0005–0.05 mol of component B per 100 grams of component A, and also contains at least two equivalents of component C as defined in claim 2 per equivalent of component B, and about 0.1–10 grams of component D as defined in claim 3 per 100 grams of component A.

5. A composition according to claim 4 wherein the component B content is about 0.001–0.015 mol per 100 grams of component A, the component C content is about 1–15 grams per 100 grams of component A, and the component D content is about 0.2–2.0 grams per 100 grams of component A.

6. A composition according to claim 4 wherein component A is a copolymer selected from the group: copolymers of vinylidene fluoride and hexafluoropropylene or pentafluoropropylene, copolymers of vinylidene fluoride, tetrafluoroethylene and hexafluoropropylene or pentafluoropropylene, and copolymers of vinylidene fluoride, hexafluoropropylene, and a perfluoroalkyl perfluorovinyl ether.

7. A composition according to claim 6 wherein component B is an ester of 4,4'-sulfonyldiphenol and a fatty acid containing 2–18 carbon atoms.

8. A composition according to claim 7 wherein said fatty acid contains 2–8 carbon atoms.

9. A composition according to claim 7 wherein component B is the diacetate of 4,4'-sulfonyldiphenol.

10. A composition according to claim 7 wherein component D is a compound of the formula

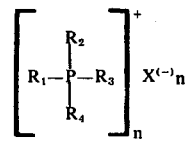

wherein P is selected from the group: phosphorous, arsenic, and antimony; $R_1$, $R_2$, $R_3$ and $R_4$ are selected individually from the group: $C_1$–$C_{20}$ alkyl, aryl, aralkyl, alkenyl, and the chlorine, fluorine, bromine, cyano, -OR and -COOR substituted analogs thereof, R being selected from the group: $C_1$–$C_{20}$ alkyl, aryl, aralkyl, and alkenyl; X is selected from the group: halide, sulfate, sulfite, carbonate, pentachlorothiophenolate, tetrafluoroborate, hexafluorosilicate, hexafluorophosphate, dimethyl phosphate and $C_1$–$C_{20}$ alkyl-, aryl-, aralkyl-, and alkenyl-/-carboxylate and -dicarboxylate; and n is 1 or 2 and equal to the valence of the anion X.

11. A composition according to claim 10 wherein component D is benzyl triphenyl phosphonium bromide or -chloride.

12. A composition according to claim 3 which also contains as an additional vulcanization agent about 1–75 mol percent, based on the total mols of vulcanization agent present, of a hydroxylic aromatic compound selected from the group: mono-, di-, tri-, and tetrahydroxybenzenes, naphthalenes, and anthracenes, and bisphenols of the formula

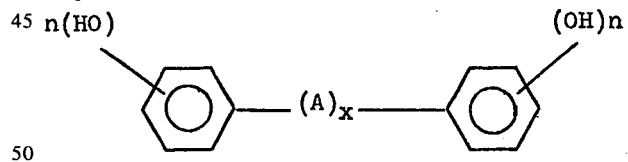

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2; and any aromatic ring of the hydroxylic compound is optionally substituted with at least one atom of chlorine, fluorine or bromine, a -CHO group, or a carboxyl or acyl radical.

* * * * *